United States Patent
Onodera et al.

(10) Patent No.: US 11,135,667 B2
(45) Date of Patent: Oct. 5, 2021

(54) MACHINING POSITION CORRECTING DEVICE AND ELECTROCHEMICAL MACHINING DEVICE

(71) Applicant: MITSUBISHI HEAVY INDUSTRIES, LTD., Tokyo (JP)

(72) Inventors: Sho Onodera, Tokyo (JP); Tetsuhei Kobayashi, Tokyo (JP); Shin Asano, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 257 days.

(21) Appl. No.: 16/233,838

(22) Filed: Dec. 27, 2018

(65) Prior Publication Data

US 2019/0275599 A1    Sep. 12, 2019

(30) Foreign Application Priority Data

Mar. 9, 2018 (JP) .............................. JP2018-042942

(51) Int. Cl.
| | |
|---|---|
| *B23H 7/26* | (2006.01) |
| *B23H 3/02* | (2006.01) |
| *B23H 3/04* | (2006.01) |
| *B23H 9/10* | (2006.01) |

(52) U.S. Cl.
CPC ............... *B23H 7/26* (2013.01); *B23H 3/02* (2013.01); *B23H 3/04* (2013.01); *B23H 9/10* (2013.01); *B23H 2400/10* (2013.01); *B23H 2500/20* (2013.01)

(58) Field of Classification Search
None
See application file for complete search history.

(56) References Cited

U.S. PATENT DOCUMENTS

| 9,403,227 B2 | 8/2016 | Tamura et al. |
| 2015/0273603 A1 | 10/2015 | Mori et al. |
| 2018/0185943 A1 | 7/2018 | Mori et al. |

FOREIGN PATENT DOCUMENTS

| JP | 62236629 | | 10/1987 | |
| JP | H0482622 | * | 3/1992 | ............... B23H 7/26 |
| JP | H0577112 | * | 3/1993 | ............... B23H 7/26 |
| JP | 2012-056036 | | 3/2012 | |
| JP | 2013-136140 | | 7/2013 | |
| JP | 2013-180389 | | 9/2013 | |
| JP | 2015-141469 | | 8/2015 | |

(Continued)

OTHER PUBLICATIONS

English translation JP2013180389, Sep. 12, 2013 (Year: 2013).*

(Continued)

*Primary Examiner* — Stefanie S Wittenberg
(74) *Attorney, Agent, or Firm* — Wenderoth, Lind & Ponack, L.L.P.

(57) ABSTRACT

A machining position correcting device is configured to be applied to an electrochemical machining device configured to make an electrolyte flow out of a distal end part of an electrode bar extending along an axis while rotating the electrode bar about the axis to electrochemically machine a material to be machined in a range from the distal end part of the electrode bar. The machining position correcting device includes a position detector configured to detect a rotational position of a feature point of the electrode bar.

4 Claims, 9 Drawing Sheets

(56) References Cited

FOREIGN PATENT DOCUMENTS

| | | |
|---|---|---|
| JP | 2016-137527 | 8/2016 |
| WO | 2014/073453 | 5/2014 |

OTHER PUBLICATIONS

Office Action dated Apr. 13, 2020 in corresponding Chinese Patent Application No. 201811579213.9, with English-language translation.

* cited by examiner

MACHINING POSITION CORRECTING DEVICE AND ELECTROCHEMICAL MACHINING DEVICE

CROSS-REFERENCE TO RELATED APPLICATIONS

The present application claims priority to and incorporates by reference the entire contents of Japanese Patent Application No. 2018-042942 filed in Japan on Mar. 9, 2018.

FIELD

The present invention relates to a machining position correcting device used for an electrochemical machining device that dissolves and machines a material to be machined by applying electricity to an electrode and the material to be machined through an electrolyte, and the electrochemical machining device.

BACKGROUND

For example, a turbine blade of a gas turbine has a cooling hole for flowing a cooling medium that cools the turbine vane and blade formed therein. In order to improve cooling efficiency through a cooling hole, a shape of the cooling hole is preferably curved along a geometric shape of a turbine blade.

Conventionally, for example, an electrochemical machining tool disclosed in Japanese Patent Application Publication No. 2013-136140 is intended to easily form a curved hole having a desired curvature. This electrochemical machining tool includes an electrode having a tubular shape extending along an axis and formed of a conductive material having flexibility, the electrode through which an electrolyte flows toward a distal end side, an insulating layer that coats an outer circumferential surface of the electrode so as to expose a distal end surface of the electrode, and a fluid discharge part at a portion of a position of the electrode in the circumferential direction configured to discharge the electrolyte flowing through the inside of the electrode toward the outside of a tool body in the radial direction. With this electrochemical machining tool, electricity is applied to a space between the distal end surface of the electrode and the inside of a machined hole of a material to be machined through an electrolyte so as to dissolve the material to be machined, which allows the machined hole to be machined deeper thereinto. An electrolyte flowing through the inside of an electrode is discharged from the distal end of the electrode, and a part of the electrolyte is also discharged from the fluid discharge part to the outside of a tool body in a radial direction. In this case, an electrolyte discharged from the fluid discharge part applies a fluid acting force to an inner surface of the machined hole so as to apply a reaction force of the fluid acting force to a tool body. In this manner, a tool body is displaced so that the tool body can bend in a direction of a reaction force, and current density distribution of the distal end surface of an electrode and the inner surface of a machined hole is locally widened depending on an amount of displacement. Thus, at a position of a tool body in the circumferential direction, an amount of machining at a side where the tool body is displaced by a reaction force becomes large, and a machined hole is curved.

Conventionally, for example, an object of a control device disclosed in Japanese Patent Application Publication No. 2016-137527 is to provide a control device of an electrolytic processing device capable of processing a bend hole of high accuracy and high reproducibility to a target passage. In the electrolytic processing device that makes an electrolyte flow out of an electrode bar distal end and electrolytically processes a region from the electrode bar distal end while rotating an electrode bar having anisotropy on the distal end thereof about the axis, this control device includes a distal end measurement information acquiring part for acquiring distal end measurement information that is position information related to the distal end of the electrode bar, a passage information storage part for storing a plane curve set based on preset target passage information, a flow volume calculation part for calculating flow volume of the electrolyte based on a deviation in a curve normal line direction of a plane curve acquired from a processing target position on the plane curve and the distal end measurement information, and an electrode direction calculation part for determining a direction of the electrode bar around the axis based on flow volume calculated by the flow volume calculation part and a deviation in the normal line direction of a plane including a plane curve acquired from the processing target position on the plane curve and the distal end measurement information.

SUMMARY

Technical Problem

The electrochemical machining tool disclosed in Japanese Patent Application Publication No. 2013-136140 can form a curved hole having a desired curvature. But, if an attachment phase of an electrode to a machining head (position of the fluid discharge part in a rotational direction with respect to the axis) is shifted, shift occurs in a machined direction and causes machining errors. For example, if a length of a material to be machined is equal to or more than 800 mm and a length of an electrode with which this material is machined to form a hole is equal to or more than 1,000 mm, it is difficult to fix a phase angle without errors at the time of attaching the electrode to a machining head. Because an electrode has flexibility, phases may be shifted on a base end and a distal end attached to a machining head side.

The control device disclosed in Japanese Patent Application Publication No. 2016-137527 can process a bend hole of high accuracy and high reproducibility to a target passage. But, when an amount of phase shifting from a processing initial stage before a processing position is measured and controlled is large, processing errors of the whole processing passage become large.

The present invention has been made to solve the problems described as above, and an object of the present invention is to provide a machining position correcting device capable of reducing an amount of phase shifting from a machining initial stage and reducing machining errors of the whole machining path, and an electrochemical machining device.

Solution to Problem

According to an aspect of the present invention, a machining position correcting device is applied to an electrochemical machining device that makes an electrolyte flow out of a distal end part of an electrode bar extending along an axis while rotating the electrode bar about the axis to electrochemically machine a material to be machined in a range from the distal end part of the electrode bar. The machining position correcting device includes a position detector configured to detect a rotational position of a feature point provided to the electrode bar.

The machining position correcting device may further include a supporting unit that is positioned and fixed along with the material to be machined. The supporting unit allows the electrode bar to be rotatably inserted and supported therein around the axis. The position detector is attached to the supporting unit.

In the machining position correcting device, the supporting unit may be a guide member that guides the electrode bar to the material to be machined.

In the machining position correcting device, the supporting unit may be provided attachably and detachably to, and be positioned and fixed to a guide member that guides the electrode bar to the material to be machined.

In the machining position correcting device, the electrode bar may include an electrode extending along the axis and having a tubular shape, the electrode being made from a conductive, flexible material, an insulating layer that coats an outer circumferential surface of the electrode so as to expose a distal end surface of the electrode, and a radial direction outlet port that is provided to a part of the distal end part of the electrode bar at a position in a radial direction, the radial direction outlet port being formed from inside of the electrode bar toward outside in the radial direction. The position detector may detect the radial direction outlet port as the feature point.

According to another aspect of the present invention, an electrochemical machining device makes an electrolyte flow out of a distal end part of an electrode bar extending along an axis while rotating the electrode bar about the axis to electrochemically machine a material to be machined in a region from of the distal end part of the electrode bar. The electrochemical machining device includes a machining head that rotatably supports the electrode bar around the axis, and a controller configured to control a rotational position of the electrode bar in the machining head. The controller controls the machining head based on the rotational position acquired from the machining position correcting device.

Advantageous Effects of Invention

According to the present invention, with a position detector that detects feature points provided to an electrode, a zero-point correction can be made so that a detected rotational position is defined as an origin and is used as a reference of an electrode phase (rotational position) of an electrode bar. After the zero-point correction, the electrode phase is adjusted to a machining target phase so as to reduce an amount of phase shifting from a machining initial stage and reduce machining errors of the whole machining path. Thus, correcting an electrode phase of an electrode bar makes it possible to reduce machining errors in particularly long curved hole machining, and leads to improvement in machining accuracy, machining yield, and a degree of freedom in design.

DESCRIPTION OF EMBODIMENTS

An embodiment according to the present invention will now be described with reference to the accompanying drawings. It should be noted that the embodiment is not intended to limit this invention. Components in the embodiment include components that can be replaced and are facilitated by the skilled person or substantially like components.

Figure 1:
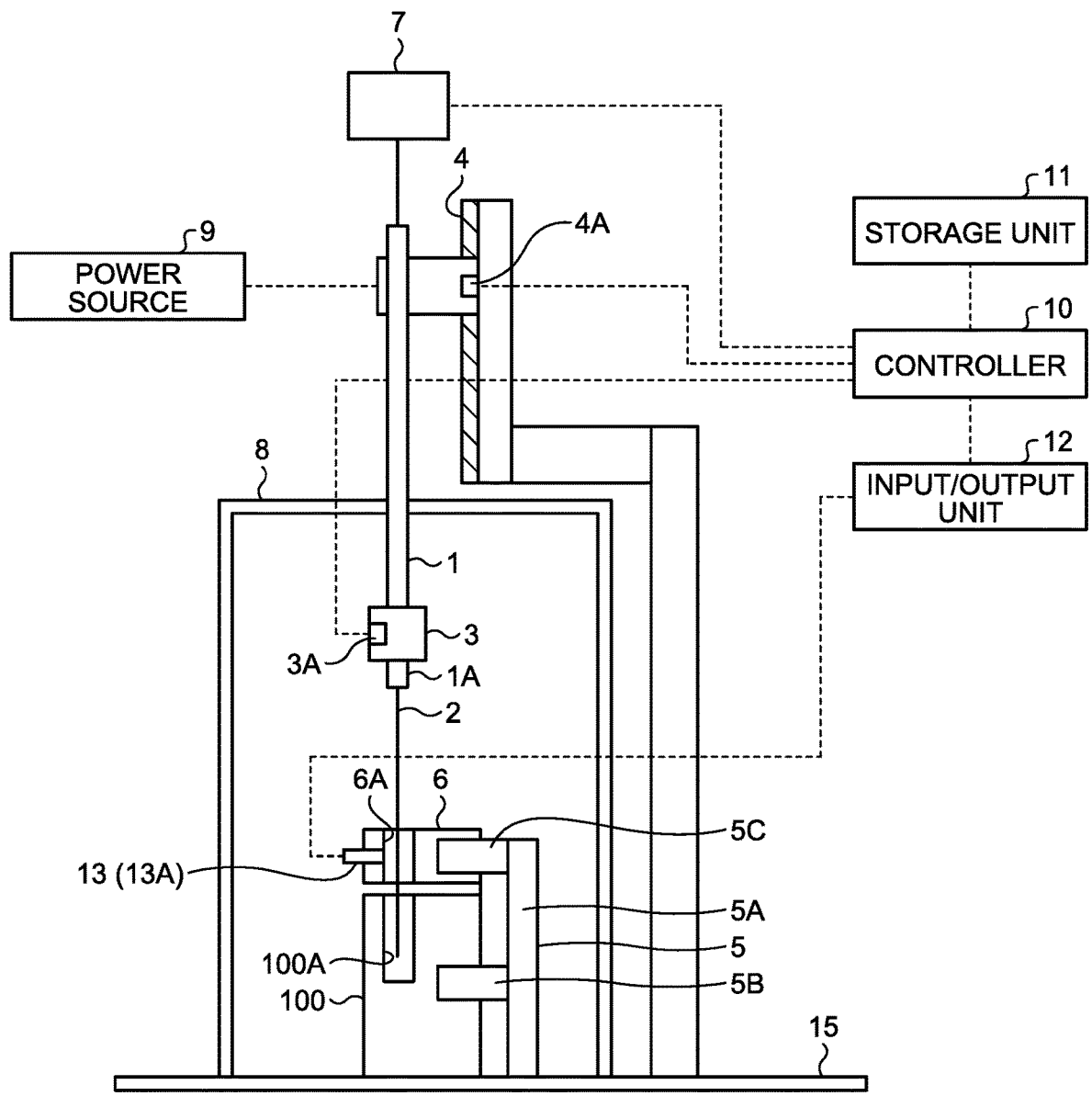
FIG. 1 is a schematic view illustrating an electrochemical machining device in accordance with an embodiment of the present invention.
Figure 2:
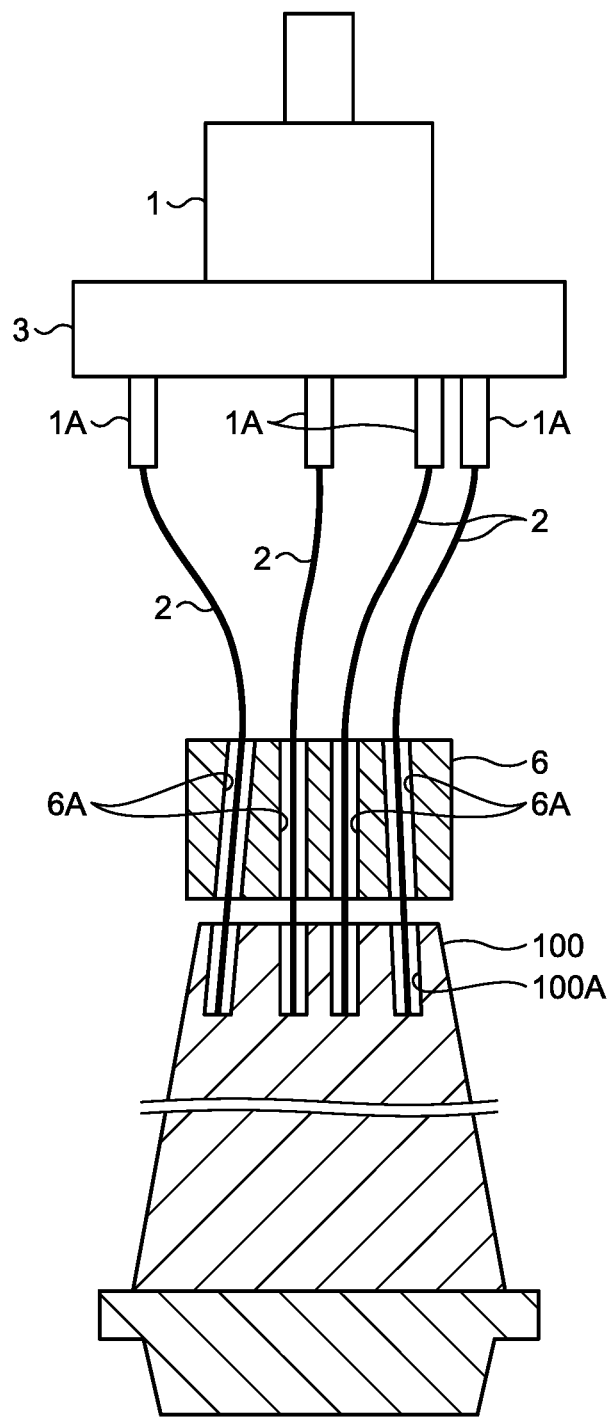
FIG. 2 is a schematic view illustrating an electrochemical machining device in accordance with the embodiment of the present invention.
Figure 3:
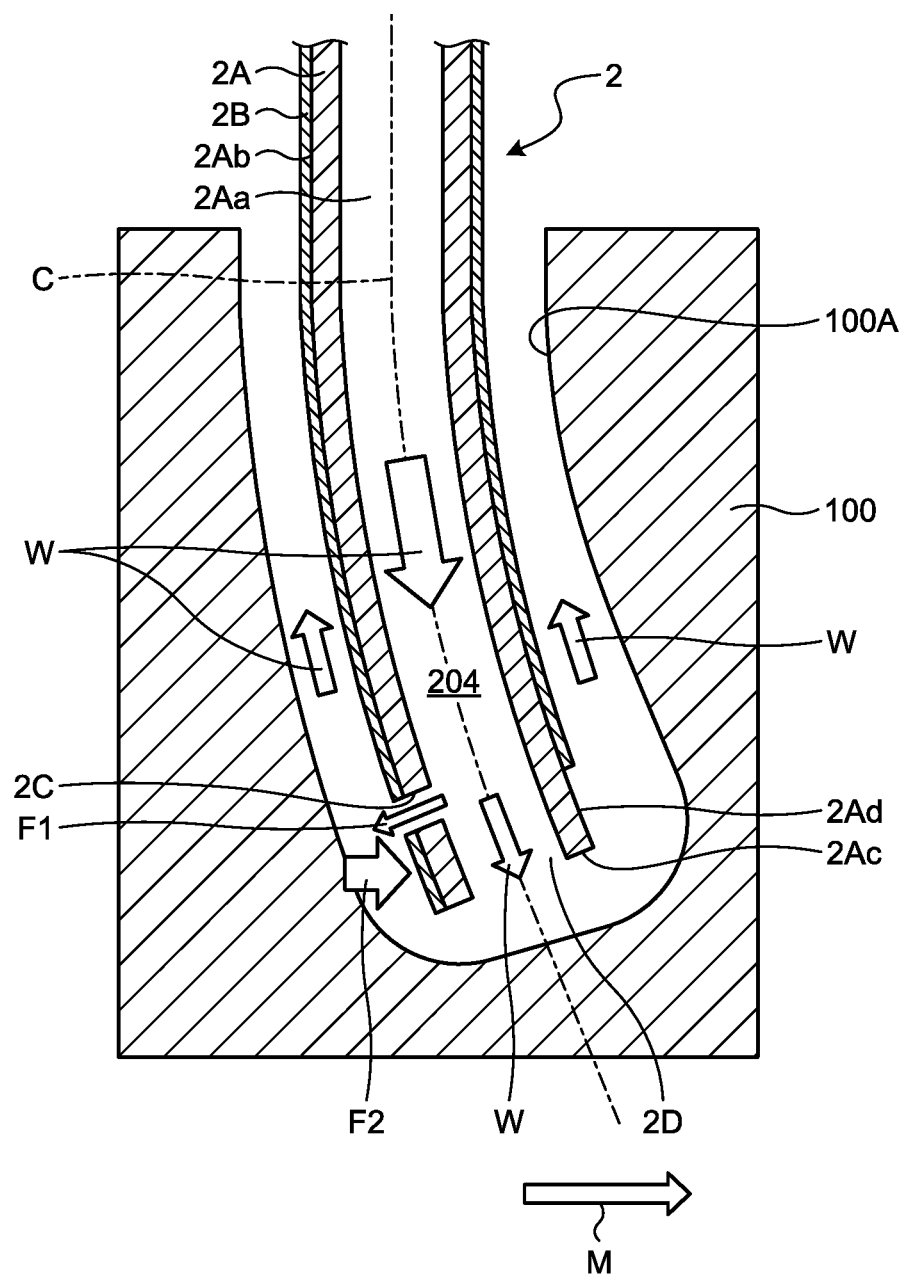
FIG. 3 is a schematic view illustrating an electrode bar in the electrochemical machining device in accordance with the embodiment of the present invention.

FIG. 1 is a schematic view illustrating an electrochemical machining device in accordance with the present embodiment. FIG. 2 is a schematic view illustrating an electrochemical machining device in accordance with the present embodiment. FIG. 3 is a schematic view illustrating an electrode bar in the electrochemical machining device in accordance with the embodiment of the present invention.

As illustrated in FIG. 1, the electrochemical machining device in the present embodiment machines a cooling hole (hereinafter, referred to as a hole) 100A to a material to be machined (workpiece) (for example, a turbine blade of a gas turbine) 100 by electrochemical machining. The electrochemical machining device includes a machining head 1, an electrode bar 2, a rotational mechanism 3, an elevating and lowering mechanism 4, a fixed base 5, a guide member 6, an electrolyte supply unit 7, a machining tank 8, a power source 9, a controller 10, a storage unit 11, an input/output unit 12, and a machining position correcting device 13.

As illustrated in FIGS. 1 and 2, the machining head 1 includes a grasping unit 1A that grasps a base end part of the electrode bar 2. A plurality of the grasping units 1A (four grasping units 1A in FIG. 2) are provided corresponding to a plurality of the holes 100A machined to the material to be machined 100.

As illustrated in FIG. 3, the electrode bar 2 includes an electrode 2A, an electrical insulating layer 2B, a radial direction outlet port 2C, and an axis direction outlet port 2D.

The electrode 2A extends along an axis C and is formed in a tubular shape. The electrode 2A is a cylindrical body the outer diameter of which is, for example, equal to or more than 1 mm and equal to or less than 10 mm. The electrode 2A is made of materials such as a stainless alloy, copper, and titanium so as to have conductivity and flexibility. In the electrode 2A of a cylindrical body, a flow path 2Aa is formed through which an electrolyte flows. The power source 9 can be connected to a base end part of the electrode 2A, and the electrolyte supply unit 7 can be connected to the flow path 2Aa.

The electrical insulating layer 2B coats an outer circumferential surface 2Ab of the electrode 2A. The electrical insulating layer 2B is formed of, for example, a polyester resin having electric insulation. The electrical insulating layer 2B does not coat a distal end surface 2Ac and a distal end side surface 2Ad of the electrode 2A, and the distal end surface 2Ac and the distal end side surface 2Ad are exposed. In the distal end side surface 2Ad, the number, the size, the position in an extending direction of the axis C of the electrode 2A, and the shape are not particularly limited.

The radial direction outlet port 2C is provided by opening on a side opposite to the distal end side surface 2Ad (symmetric position with reference to the axis C) across the axis C, and communicates the flow path 2Aa with the outside by passing through the electrode 2A and the electrical insulating layer 2B in the radial direction. The radial direction is a direction orthogonal to the axis C. An aperture shape of the radial direction outlet port 2C is not particularly limited, and may be rectangular or circular. When the radial direction outlet port 2C is inclined toward the side opposite to the distal end side surface 2Ad, the number of the radial direction outlet port 2C is, not limited to one, and the size of the radial direction outlet port 2C is not particularly limited.

The axis direction outlet port 2D is provided by opening a tubular shape at the distal end of the electrode 2A along the axis C, and communicates the flow path 2Aa with the outside.

The rotational mechanism 3 causes the grasping unit 1A to rotate about the axis C in the machining head 1. A motor, which is not illustrated, causes the grasping unit 1A to rotate, and causes the electrode bar 2 grasped by the grasping unit 1A to rotate about the axis C in association with the rotation of the grasping unit 1A. The rotational mechanism 3 includes a rotational detector 3A that detects a rotational angle of the grasping unit 1A (electrode bar 2).

The elevating and lowering mechanism 4 elevates and lowers the machining head 1 along the axis C. A motor, which is not illustrated, elevates and lowers the machining head 1, and elevates and lowers the electrode bar 2 grasped by the grasping unit 1A along the axis C in association with the elevating and lowering of the machining head 1. The elevating and lowering mechanism 4 includes a position detector 4A that detects an elevating and lowering position of the machining head 1 (electrode bar 2).

The fixed base 5 fixes the material to be machined 100 and the guide member 6. The fixed base 5 includes a fixing unit 5A, a first supporting unit 5B, and a second supporting unit 5C. The fixing unit 5A is fixed to an immovable device base 15. The first supporting unit 5B supports the material to be machined 100, is movable in an axis extending direction and an axis rotational direction with respect to a vertical axis and first and second horizontal axes orthogonal to each other, and adjusts a vertical position and a horizontal position of the material to be machined 100. The second supporting unit 5C supports the guide member 6, is movable in an axis extending direction and an axis rotational direction with respect to a vertical axis and first and second horizontal axes orthogonal to each other, and adjusts a vertical position and a horizontal position of the guide member 6. In this manner, the fixed base 5 adjusts the vertical positions and the horizontal positions of the material to be machined 100 and the guide member 6 together.

The guide member 6 is supported by the fixed base 5, and is disposed directly on the material to be machined 100. The guide member 6 is provided with a guide hole 6A for communicating the machining head 1 side with the material to be machined 100 side in an up-and-down direction. The guide hole 6A rotatably supports the electrode bar 2 around the axis C while allowing the electrode bar 2 to be inserted therein in an up-and-down direction, and a plurality of the guide holes 6A (4 guide holes 6A in FIG. 2) are provided corresponding to the holes 100A machined to the material to be machined 100. The guide holes 6A are formed in conformity with the position of the holes 100A machined to the material to be machined 100 and an angle (direction) with which the distal end part of the electrode bar 2 is introduced in order to machine the holes 100A to the material to be machined 100. Thus, When the elevating and lowering mechanism 4 lowers the electrode bar 2 inserted into the guide holes 6A, the distal end part of the electrode bar 2 is guided to reach the material to be machined 100 so as to match the position of the holes 100A machined to the material to be machined 100, and the distal end part of the electrode bar 2 is guided to reach the material to be machined 100 so as to match the angle of the machined holes 100A.

The electrolyte supply unit 7 supplies an electrolyte to the flow path 2Aa of the electrode 2A in the electrode bar 2. In the electrolyte supply unit 7, a supply tube and a pump are connected to a storage part that stores therein an electrolyte, and the supply tube is connected to the flow path 2Aa of the electrode 2A through the machining head 1, which are not illustrated. Examples of the electrolyte include nitric acid and nitrate of soda.

The machining tank 8 coats the periphery of the machining head 1 to which the electrode bar 2 is attached and the periphery of the fixed base 5. In this manner, the machining tank 8 prevents scattering of an electrolyte while protecting the material to be machined 100 during machining.

The power source 9 supplies electric power to the electrochemical machining device.

The controller 10 is, for example, a computer, and includes a microprocessor such as a central processing unit (CPU). The controller 10 includes a display device including a display, an input device including a keyboard and a mouse, a sound output device including a speaker, and a drive device that reads data such as a computer program for executing arithmetic processing of the controller 10 from a recording medium in which the data is recorded, which are not illustrated. Examples of the recording medium can include various types of recording media that are a recording media optically, electrically, or magnetically recording information such as a compact disc read only memory (CD-ROM), a flexible disk, and a magnetic optical disk, and a semiconductor memory electrically recording information such as a read-only memory (ROM) and a flash memory.

The storage unit 11 is included in the controller 10, includes memories such as ROM and a random-access memory (RAM), and storage, and stores therein a computer program for performing arithmetic processing in the controller 10.

The input/output unit 12 inputs and outputs various kinds of data. Specifically, the input/output unit 12 is connected to the machining position correcting device 13 and the controller 10, and outputs data input from the machining position correcting device 13 to the controller 10.

The machining position correcting device 13, which will be described in detail later, detects a rotational position of the distal end part of the electrode bar 2 based on feature points provided to the electrode bar 2. The detected data is output to the controller 10 through the input/output unit 12 as described above.

The controller 10 controls the electrochemical machining device (the rotational mechanism 3, the elevating and lowering mechanism 4, the electrolyte supply unit 7, and the power source 9) based on data from the input/output unit 12 (machining position correcting device 13) and a computer program in the storage unit 11.

Specifically, the controller 10 causes the storage unit 11 to store therein a rotational position of the distal end part of the electrode bar 2 acquired from the machining position correcting device 13. The controller 10 causes, based on a computer program in the storage unit 11, the distal end part of the electrode bar 2 to reach the material to be machined 100 through the elevating and lowering mechanism 4. The controller 10 causes the power source 9 to supply electric power to the electrode 2A in the electrode bar 2, and causes the electrolyte supply unit 7 to supply an electrolyte to the flow path 2Aa of the electrode 2A. In this manner, electricity is applied to a space between the distal end part of the electrode 2A and the material to be machined through the electrolyte, so as to dissolve the material to be machined 100 and machine the holes 100A. When curving and machining the holes 100A, the controller 10 causes the rotational mechanism 3 to rotate the electrode bar 2. As illustrated in FIG. 3, an electrolyte W flowing through the flow path 2Aa of the electrode 2A is discharged from the axis direction outlet port 2D on the distal end surface of the electrode 2A, and a part of the electrolyte W is also discharged from the radial direction outlet port 2C toward the outside of the electrode bar 2 in the radial direction. In this case, the electrolyte W discharged from the radial direction outlet port 2C applies a fluid acting force F1 to an inner surface of the holes 100A, so as to apply a reaction force F2 of the fluid acting force F1 to the distal end part of the electrode bar 2. In this manner, the distal end part of the electrode bar 2 is displaced so that the distal end part bends in a direction where the reaction force F2 directs M, and current density distribution of the distal end surface of the electrode bar 2 and the inner surface of the holes 100A is locally wider depending on an amount of displacement. Thus, at a position of the electrode bar 2 in the circumferential direction, an amount of machining on a side where the electrode bar 2 is displaced by the reaction force F2 becomes large, and the holes 100A are curved.

Figure 4:
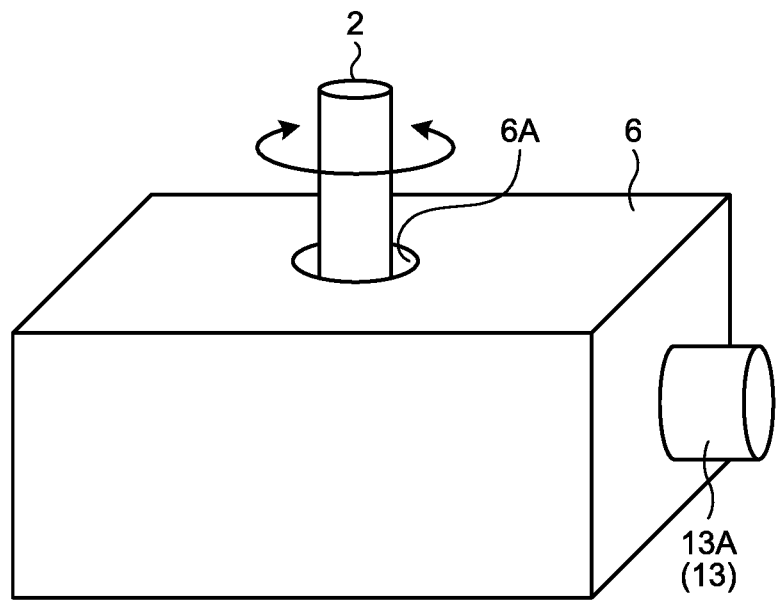
FIG. 4 is a schematic view illustrating a machining position correcting device in accordance with the embodiment of the present invention.
Figure 5:
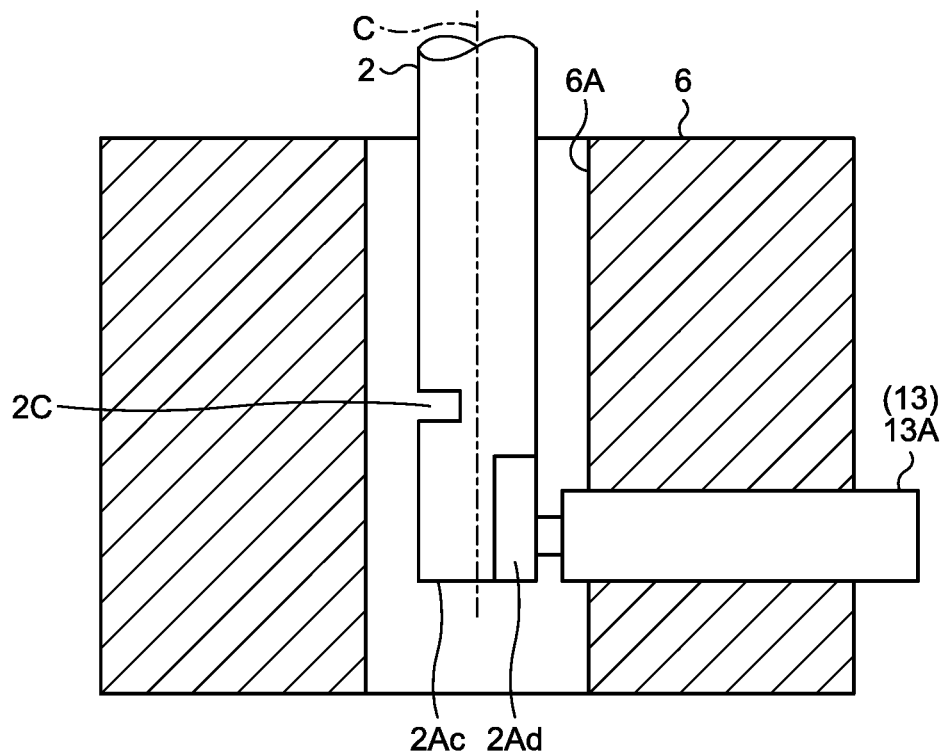
FIG. 5 is an enlarged schematic view illustrating the machining position correcting device in accordance with the embodiment of the present invention.
Figure 6:
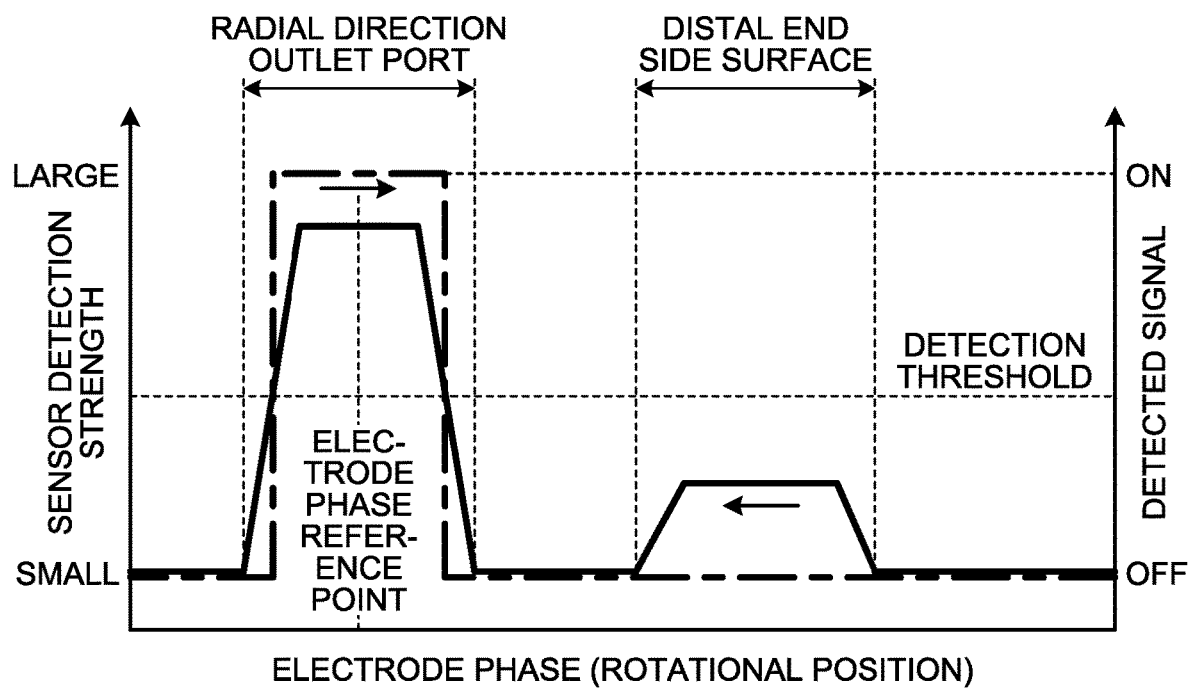
FIG. 6 is a view illustrating a detection example of the machining position correcting device in accordance with the embodiment of the present invention.
Figure 7:
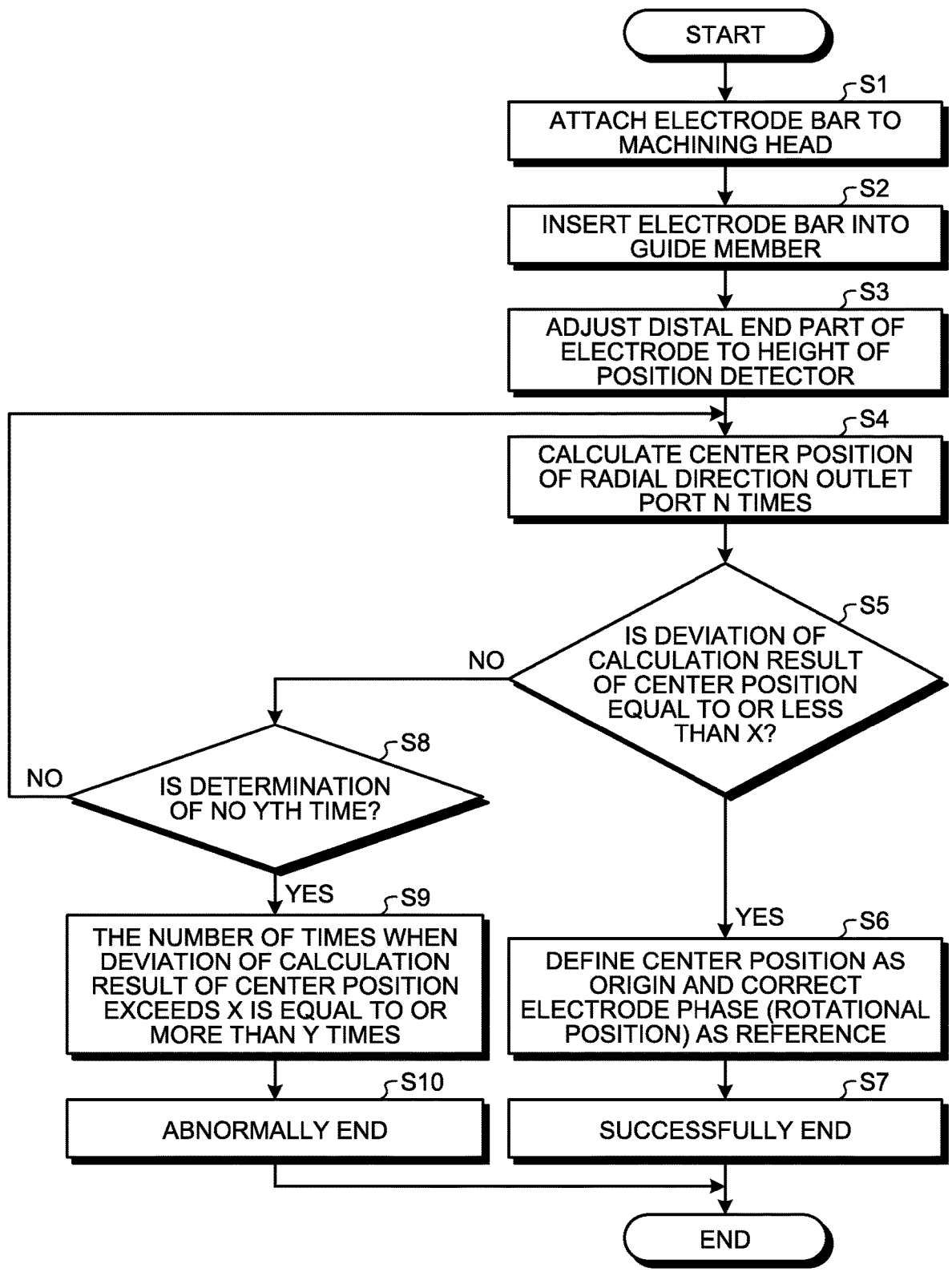
FIG. 7 is an operation step view of the machining position correcting device in accordance with the embodiment of the present invention.
Figure 8:
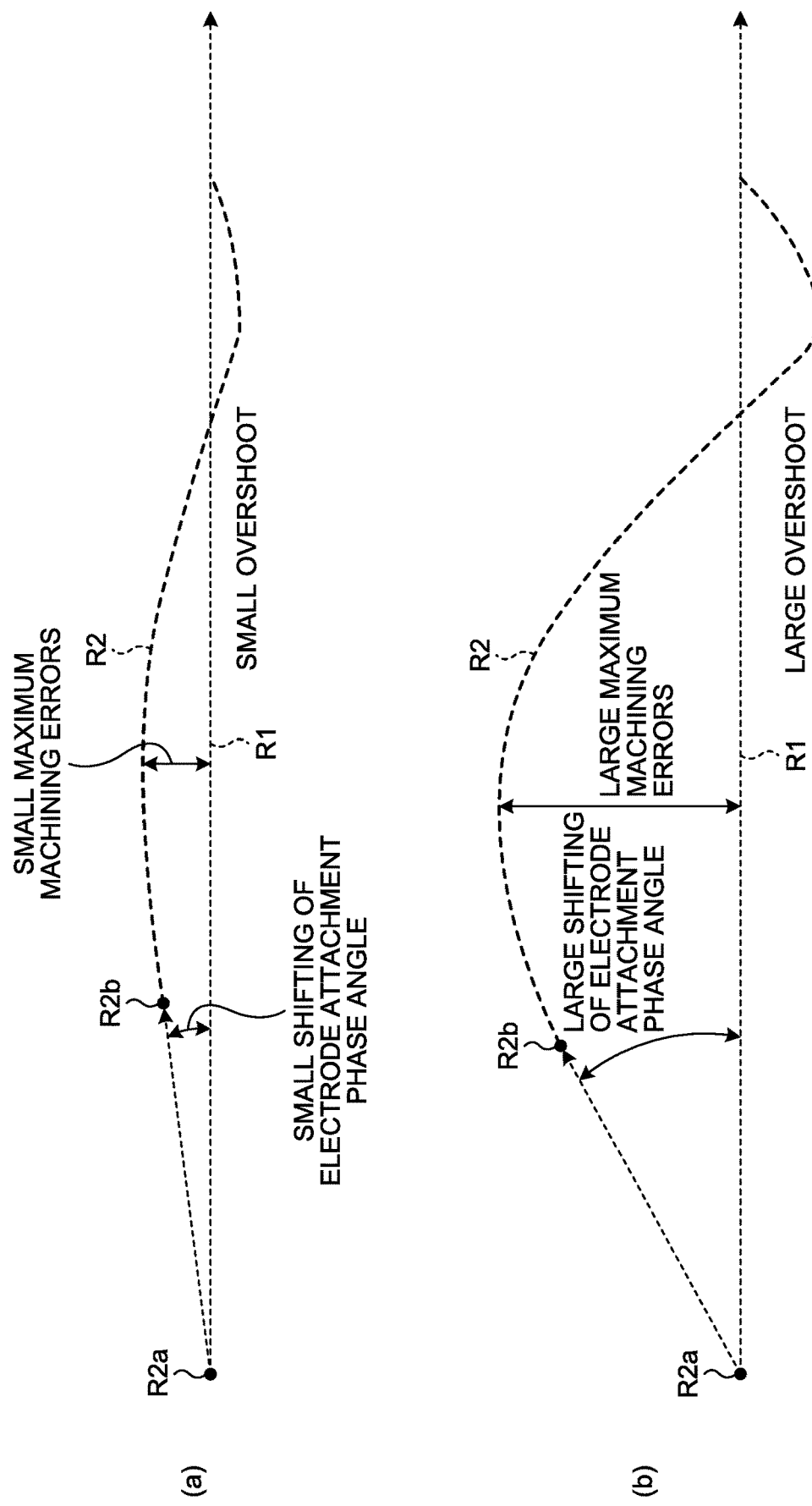
FIG. 8 is an explanatory view illustrating machining errors.
Figure 9:
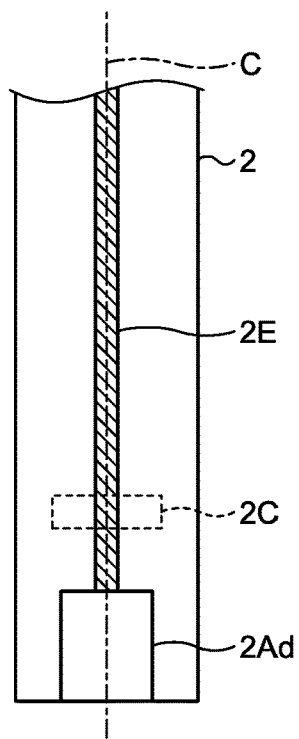
FIG. 9 is a view illustrating another example of a feature point of the machining position correcting device in accordance with the embodiment of the present invention.
Figure 10:
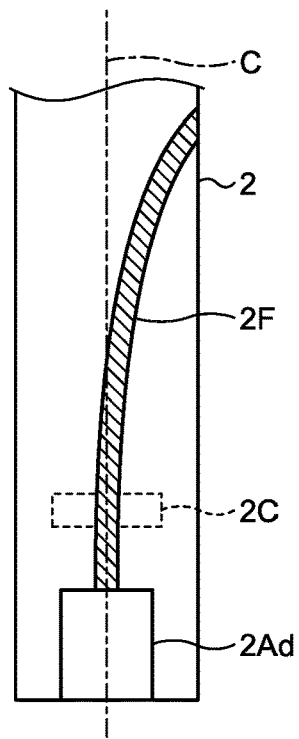
FIG. 10 is a view illustrating another example of a feature point of the machining position correcting device in accordance with the embodiment of the present invention.
Figure 11:
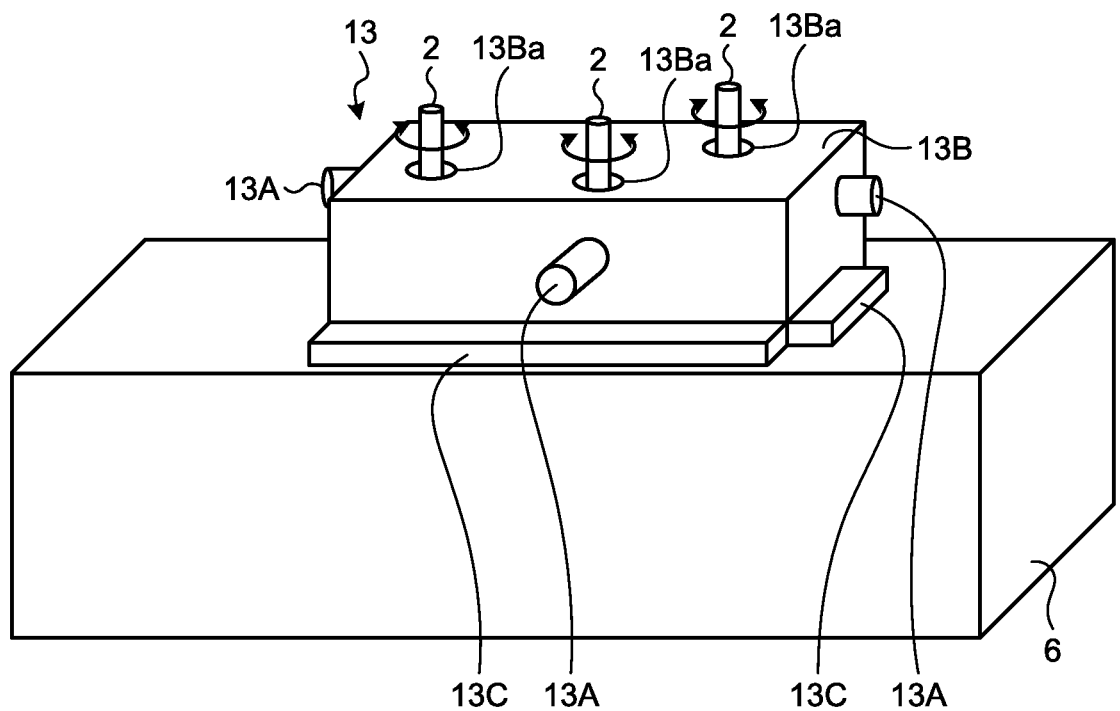
FIG. 11 is a schematic view illustrating another example of the machining position correcting device in accordance with the embodiment of the present invention.

FIG. 4 is a schematic view illustrating a machining position correcting device in accordance with the present embodiment. FIG. 5 is an enlarged schematic view illustrating the machining position correcting device in accordance with the present embodiment. FIG. 6 is a view illustrating a detection example of the machining position correcting device in accordance with the present embodiment. FIG. 7 is an operation step view of the machining position correcting device in accordance with the embodiment of the present invention. FIG. 8 is a view illustrating another example of a feature point of the machining position correcting device in accordance with the present embodiment. FIGS. 9 and 10 are views illustrating another example of a feature point of the machining position correcting device in accordance with the present embodiment. FIG. 11 is a schematic view illustrating another example of the machining position correcting device in accordance with the present embodiment.

As illustrated in FIGS. 4 and 5, the machining position correcting device 13 includes a position detector 13A. The position detector 13A detects a feature point provided to the electrode bar 2, and detects a rotational position of the distal end part of the electrode bar 2 based on this feature point. Examples of the feature points include the radial direction outlet port 2C formed in the electrode bar 2 and the distal end side surface 2Ad of the electrode 2A in the present embodiment. In order to detect the radial direction outlet port 2C and the distal end side surface 2Ad of the electrode 2A, examples of the position detector 13A include a proximity sensor (photoelectric, magnetic, eddy-current, contact, laser detection, and the like) and an image sensor (imaging device). In addition, in order to detect the distal end side surface 2Ad of the electrode 2A, examples of the position detector 13A include an electric conduction sensor detecting a metal unit and an image sensor (imaging device). The position detector 13A is attached to the guide member 6, and detects a feature point of the electrode bar 2 inserted into the guide hole 6A.

The machining position correcting device 13 detects, in a state where the rotational mechanism 3 rotates the electrode bar 2 inserted into the guide hole 6A, a feature point of the electrode bar 2, so as to detect a rotational position using the feature points as a reference. FIG. 6 illustrates an example of data where a photoelectric proximity sensor that switches a detected signal on and off depending on a distance from a detected position to an object to be detected is used. In the case of the photoelectric proximity sensor, as indicated by a solid line in FIG. 6, the photoelectric proximity sensor detects the radial direction outlet port 2C and the distal end side surface 2Ad, but the radial direction outlet port 2C has a larger sensor detection strength. Thus, a detection threshold is provided in the sensor detection strength, so as to turn a detected signal of only the radial direction outlet port 2C on and off as indicated by a dot-and-dash line. In this manner, a center position of the radial direction outlet port 2C in a rotational direction can be calculated, and the center position of the radial direction outlet port 2C in the rotational direction can be defined as an origin and can be used as a reference of an electrode phase (rotational position) of the distal end part of the electrode bar 2.

As illustrated in FIG. 7, the controller 10 performs operation for correcting a machining position. After an operator attaches the electrode bar 2 to the machining head 1 (step S1), the controller 10 controls the elevating and lowering mechanism 4 to insert the electrode bar 2 into the guide holes 6A in the guide member 6 (step S2). At this time, the controller 10 acquires an elevating and lowering position from the elevating and lowering mechanism 4, and adjusts the distal end part of the electrode 2A to a height of the position detector 13A (step S3). After that, the controller 10 controls the rotational mechanism 3 to rotate the electrode bar 2 about the axis C, and causes the position detector 13A to input a detected signal once for each rotation and calculates the center position of the radial direction outlet port 2C N times (step S4). N times indicates multiple times. When a deviation of a calculation result of the center position in N times is equal to or less than X (Yes at step S5), the controller 10 makes a zero-point correction (step S6) so that the center position is defined as an origin and is used as a reference of an electrode phase (rotational position) of the electrode bar 2. The controller 10 causes the storage unit 11 to store therein the reference of the corrected electrode phase (rotational position) of the electrode bar 2. After that, the controller 10 ends this operation successfully (step S7). In the subsequent machining operation, the controller 10 causes the rotational mechanism 3 to rotate the electrode bar 2 based on the reference of the corrected electrode phase (rotational position) of the electrode bar 2. By contrast, at step S5, when a deviation of a calculation result of the center position in N times is not equal to or less than X (No at step S5), the controller 10 determines whether determination of No is the Yth time (for example, the third time) (step S8). If not (No at step S8), the process goes back to the processing at step S4 and the center position of the radial direction outlet port 2C is calculated N times. When determination of No is the Yth time (Yes at step S8), the number of times when a deviation of a calculation result of the center position exceeds X is equal to or more than Y times (step S9), thereby ending this operation abnormally (step S10). After that, when examining the cause why a deviation exceeds X and, for example, attachment of the electrode bar 2 to the machining head 1 is insufficient, the operator reattaches the electrode bar 2 to the machining head 1 and performs the operation again.

According to the machining position correcting device 13 and the electrochemical machining device of the present embodiment, with the position detector 13A that detects a feature point provided to the electrode bar 2, a zero-point correction can be made so that a detected rotational position is defined as an origin and is used as a reference of an electrode phase (rotational position) of the electrode bar 2. After the zero-point correction, the electrode phase is adjusted to a machining target phase so as to reduce an amount of phase shifting from a machining initial stage and reduce machining errors of the whole machining path. Thus, correcting an electrode phase of the electrode bar 2 reduces machining errors in particularly long curved hole machining, and leads to improvement in machining accuracy, machining yield, and a degree of freedom in design.

The following describes machining errors. FIG. 8 is an explanatory view illustrating machining errors. FIG. 8(a) illustrates a case where a zero-point correction of the electrode phase (rotational position) of the electrode bar 2 is made. FIG. 8(b) illustrates a case where a zero-point correction of the electrode phase (rotational position) of the electrode bar 2 is not made.

As illustrated in FIG. 8(b), when a zero-point correction of the electrode phase (rotational position) of the electrode bar 2 is not made, as compared with a target route R1 of the design electrode bar 2 machining the holes 100A to the material to be machined 100, an amount of phase shifting of a machining route R2 that reaches a machining initial stage R2b from a machining start R2a is large. Even when the machining route R2 is corrected to the target route R1 from the machining initial stage R2b, the machining route R2 cannot be immediately corrected to the target route R1 in order to smoothly connect the holes 100A. Thus, the maximum machining errors between the target route R1 and the machining route R2 are large, and overshoot is large until the machining route R2 is corrected to the target route R1.

By contrast, in the machining position correcting device 13 and the electrochemical machining device of the present embodiment, as illustrated in FIG. 8(a), by making a zero-point correction of the electrode phase (rotational position) of the electrode bar 2, as compared with the target route R1 of the design electrode bar 2 machining the holes 100A to the material to be machined 100, an amount of phase shifting of the machining route R2 that reaches the machining initial stage R2b from the machining start R2a is small. If the machining route R2 needs to be corrected to the target route R1 from the machining initial stage R2b, the machining route R2 can be immediately corrected to the target route R1. Thus, the maximum machining errors between the target route R1 and the machining route R2 are small, and overshoot is also small until the machining route R2 is corrected to the target route R1.

It is preferable that the machining position correcting device 13 and the electrochemical machining device of the present embodiment include a supporting unit (guide member 6) that is positioned and fixed along with the material to be machined 100 and that has the electrode bar 2 rotatably inserted and supported therein around the axis C, and the position detector 13A be attached to the supporting unit (guide member 6).

In other words, by attaching the position detector 13A to the supporting unit (guide member 6) that is positioned and fixed along with the material to be machined 100, a support position of the electrode bar 2 can be positioned with respect to the material to be machined 100 that is going to be machined, and a zero-point correction of the electrode phase (rotational position) of the electrode bar 2 can be made in this embodiment. Thus, machining errors can be reduced more.

In the machining position correcting device 13 and the electrochemical machining device of the present embodiment, the supporting unit is preferably the guide member 6 that guides the electrode bar 2 to the material to be machined 100.

In other words, the configuration for positioning a support position of the electrode bar 2 with respect to the material to be machined 100 that is going to be machined can be shared with the guide member 6 that guides the electrode bar 2 to the material to be machined 100, the number of components can be reduced, and the device can be miniaturized.

In the machining position correcting device 13 and the electrochemical machining device of the present embodiment, the position detector 13A preferably detects the radial direction outlet port 2C or the distal end side surface 2Ad as a feature point.

In other words, a new feature point is not necessarily provided by detecting the configuration for machining the curved holes 100A to the material to be machined 100 as a feature point. Thus, the number of configurations for making a zero-point correction of the electrode phase (rotational position) of the electrode bar 2 can be reduced.

The feature point is not limited to the radial direction outlet port 2C and the distal end side surface 2Ad described above. FIGS. 9 and 10 are views illustrating another example of the feature point of the machining position correcting device in accordance with the present embodiment.

The feature point illustrated in FIG. 9 is a straight line 2E that is successively drawn along the axis C on the surface of the electrode bar 2. The straight line 2E is, for example, drawn on a line where the center of the distal end side surface 2Ad extends along the axis C. Detecting the straight line 2E by the position detector 13A makes it possible to detect a rotational position of the distal end side surface 2Ad. In addition, the straight line 2E can be detected in real time during machining because the straight line 2E is successively drawn along the axis C.

The feature point illustrated in FIG. 10 is a curved line 2F that is drawn by successively turning with respect to the extending direction of the axis C to match a rotational position of the electrode bar 2 corresponding to curving of the holes 100A machined on the surface of the electrode bar 2. By rotating the lowering electrode bar 2 so that the position detector 13A detects the curved line 2F, the holes 100A can be machined in predetermined curving. In addition, the curved line 2F can be detected in real time during machining because the curved line 2F is successively drawn along the axis C.

FIG. 11 is a schematic view illustrating another example of the machining position correcting device in accordance with the present embodiment.

The machining position correcting device 13 illustrated in FIG. 11 includes a supporting unit 13B that is formed independently of the guide member 6. The supporting unit 13B is provided with supporting holes 13Ba that rotatably support the electrode bars 2 around the axis C while allowing the electrode bars 2 to be inserted therein in an up-and-down direction. The supporting unit 13B is provided with the position detector 13A to match the position of the supporting holes 13Ba. The supporting holes 13Ba and the position detectors 13A are provided by the number of the electrode bars 2 attached to the electrochemical machining device. This supporting unit 13B is provided attachably and detachably to the guide member 6, and is positioned and fixed by a positioning mechanism 13C. The positioning mechanism 13C specifies vertical positions and horizontal positions of the supporting holes 13Ba of the supporting unit 13B with respect to the guide member 6. By fixing the supporting unit 13B to the guide member 6 through the positioning mechanism 13C, the support positions, vertical positions and horizontal positions, of the electrode bars 2 are positioned with respect to the material to be machined 100 that is going to be machined, and a zero-point correction of the electrode phase (rotational position) of the electrode bars 2 can be made in this embodiment.

In this manner, the machining position correcting device 13 of the present embodiment includes the supporting unit 13B that is provided attachably and detachably to, and is positioned and fixed to the guide member 6 guiding the electrode bar 2 to the material to be machined 100.

When, for example, a nitric acid-based electrolyte or a sodium nitrate-based electrolyte is used and affects the position detector 13A, lifetime of the position detector 13A may be shortened. In the machining position correcting device 13 of the present embodiment, the supporting unit 13B is provided attachably and detachably to the guide member 6 and the supporting unit 13B is removed from the guide member 6 during machining, thereby preventing an electrolyte from affecting the position detector 13A.

REFERENCE SIGNS LIST

1 Machining head
1A Grasping unit
2 Electrode bar
2A Electrode
2Aa Flow path
2Ab Outer circumferential surface
2Ac Distal end surface
2Ad Distal end side surface
2B Electrical insulating layer
2C Radial direction outlet port
2D Axis direction outlet port
2E Straight line
2F Curved line
3 Rotational mechanism
3A Rotational detector
4 Elevating and lowering mechanism
4A Position detector
5 Fixed base
5A Fixing unit
5B First supporting unit
5C Second supporting unit
6 Guide member
6A Guide hole
7 Electrolyte supply unit
8 Machining tank
9 Power source
10 Controller
11 Storage unit
12 Input/output unit
13 Machining position correcting device
13A Position detector
13B Supporting unit
13Ba Supporting hole
13C Positioning mechanism
15 Device base
100 Material to be machined
100A Hole
C Axis
F1 Fluid acting force
F2 Reaction force
M Direction where reaction force directs
R1 Target route
R2 Machining route
W Electrolyte

The invention claimed is:

1. An electrochemical machining device configured to make an electrolyte flow out of a distal end part of an electrode bar extending along an axis while rotating the electrode bar about the axis to electrochemically machine a material to be machined in a range from the distal end part of the electrode bar, the electrochemical machining device comprising:
    a machining head configured to rotatably support the electrode bar around the axis;
    a machining position correcting device; and
    a controller configured to control a rotational position of the electrode bar in the machining head, and control the machining head based on a rotational position of a feature point of the electrode bar detected by the machining position correcting device,
    wherein the electrode bar includes:
        an electrode extending along the axis and having a tubular shape, the electrode being made from a conductive, flexible material;
        an insulating layer coated on an outer circumferential surface of the electrode so as to expose a distal end surface of the electrode; and
        a radial direction outlet port defined at the distal end part of the electrode bar at a position in a radial direction, the radial direction outlet port being defined from inside of the electrode bar toward outside of the electrode bar in the radial direction, and
    wherein the machining position correcting device includes a position detector configured to detect the rotational position of the radial direction outlet port as the feature point.

2. The machining position correcting device according to claim 1, further comprising:
    a supporting unit that is positioned and fixed along with the material to be machined,
    wherein:
    the supporting unit is configured to receive the electrode bar therein such that the electrode bar is rotatably insertable therein around the axis; and
    the position detector is attached to the supporting unit.

3. The machining position correcting device according to claim 2, wherein the supporting unit is a guide member configured to guide the electrode bar to the material to be machined.

4. The machining position correcting device according to claim 2, wherein the supporting unit is attachable and detachable to a guide member configured to guide the electrode bar to the material to be machined.

* * * * *